United States Patent
André

(10) Patent No.: US 6,690,736 B1
(45) Date of Patent: Feb. 10, 2004

(54) BIT ALLOCATION IN A TRANSMISSION SYSTEM

(75) Inventor: Tore André, Älvsjö (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/555,668

(22) PCT Filed: Nov. 13, 1998

(86) PCT No.: PCT/SE98/02050
§ 371 (c)(1),
(2), (4) Date: Jun. 1, 2000

(87) PCT Pub. No.: WO99/30465
PCT Pub. Date: Jun. 17, 1999

(30) Foreign Application Priority Data

Dec. 5, 1997 (SE) .................................................. 9704551

(51) Int. Cl.$^7$ ............................ H04K 1/10; H04L 27/28
(52) U.S. Cl. ........................................ 375/260; 375/240
(58) Field of Search ................................ 375/260, 240, 375/248, 285; 370/468

(56) References Cited

U.S. PATENT DOCUMENTS

| | | | | |
|---|---|---|---|---|
| 4,535,472 A | * | 8/1985 | Tomcik | 704/229 |
| 5,479,447 A | * | 12/1995 | Chow et al. | 375/260 |
| 5,627,937 A | * | 5/1997 | Kim | 704/229 |
| 5,812,599 A | * | 9/1998 | Van Kerckhove | 375/260 |
| 6,005,893 A | * | 12/1999 | Hyll | 375/260 |

* cited by examiner

Primary Examiner—Stephen Chin
Assistant Examiner—Lawrence Williams

(57) ABSTRACT

A quality factor is associated to each carrier within a multicarrier system wherein a loading constant is computed as the quotient of a difference and the number of carriers that have no bits allocated, the difference being the difference of the sum of the bit error rates for carriers that have no bits allocated and the total remaining number of data bits that are not allocated, and allocating a number of bits to a carrier that has no bits allocated, the number of bits being the difference of the quality factor and the loading constant rounded to nearest integer, repeating the allocation until a predetermined fraction of the carriers have bits allocated, and reiterating the above steps until all carriers have bits allocated.

13 Claims, 5 Drawing Sheets

BIT ALLOCATION IN A TRANSMISSION SYSTEM

This application is a PCT of PCT/SE98/2050 filed on Nov. 13, 1998.

TECHNICAL FIELD OF THE INVENTION

The present invention relates to a multicarrier or discrete multi tone (DMT) modulated transmission system, in which the modulation may be effected using a fast inverse Fourier transform (IFFT). More specifically, the invention relates to a method for bit allocation in such a transmission system and to the transmission system itself.

DESCRIPTION OF RELATED ART

Multicarrier modulation is a technique in which a data stream is divided into several interleaved bit streams. The bit streams are used to modulate several carriers, whereafter the modulated carriers are summed for transmission.

Detailed descriptions of the principle of multicarrier modulation may be found in J.A.C. Bingham, *Multicarrier modulation for data transmission: an idea whose time has come*, IEEE Communications Magazine, May 1990, pp. 5–14, and in references therein.

The carriers, which are spaced within a useable frequency band, and of which each is constituting a subchannel, are modulated at a block or symbol transmission rate. The number of bits of input data per block or symbol $n_j$, and the proportion $n_j$ of total transmitted power P, that are allocated to each carrier or subchannel j, are preferably determined to maximize the signal-to-noise ratio (SNR) at a given bit rate or to maximize the bit rate at a given maximally allowed overall signal-to-noise ratio (SNR).

This is approximately achieved by choosing the variables $n_j$ and $\gamma_j$ so that the bit error rates in all subchannels are substantially equal. As a consequence, the different subchannels may transfer different number of bits per symbol and/or use different transmitting powers. Various techniques have been proposed to determine the bit allocation factors $n_j$ and the power portions $\gamma_j$ at different conditions.

Through the U.S. Pat. No. 4,438,511 (dated 1984) issued to Baran a rather simple bit rate reduction technique is known in which each subchannel carries a predetermined number of bits at a specified power level. The noise at each frequency is measured and a decision is made whether to transmit or not at each carrier frequency. Thus, this technique compensates for the actual distribution of noise over the available frequency range, but to the cost of a reduced bit rate.

The well known water-filling algorithm, described in e.g. J. G. Proakis, *Digital Communication*, $3_{rd}$ edition, McGraw-Hill, New York, 1995 is the information theoretic method for optimizing the power distribution among the subchannels. A noise spectrum is measured, i.e., the noise as a function of the frequency, whereafter available power is allocated to the subchannels in such a manner that the sum of the noise and the power is equal for all of the subchannels. The maximum number of bits to be allocated to each subchannel is then calculated from the power distribution obtained and the desired bit-error-rate of each subchannel. The water-filling algorithm is, however, difficult to implement due to computational difficulties and that it may result in non-integer constellations sizes.

One implementation for constellations with integer numbers of allocated bits is described in the U.S. Pat. Nos. 4,679,227, 4,731,816 and 4,833,706 (1987–1989) issued to Hughes-Hartogs. The basic principle is to incrementally add, one bit at a time, the amount of data to be transmitted in each symbol until a predetermined data rate or power constraint is reached. The subchannel to which a bit is allocated is chosen as the one who requires the least amount of incremental power at a given bit-error rate. This technique is, however, slow in convergence and assumes a time invariant signal-to-noise ratio of the subchannels.

In order to obtain faster convergence to the cost of a slightly degraded performance Chow et al. proposed another technique described in, e.g., the U.S. Pat. No. 5,479,447 (1995). According to this technique, which may also take time-varying characteristics of the transmission medium into account and hence maintain optimal bit allocation during system operation, an initial optimal transmission rate based on initial signal-to-noise ratio estimates of the subchannels is determined. Then, the total number of bits per symbol to be transmitted in each subchannel is determined through an initial bit allocation method, in which convergence is guaranteed with a suboptimal loop. The energy distribution among the subchannels may be adjusted according to some constraint regarding the transmit power distribution. Lastly, system operation adaptivity is achieved by monitoring the subchannel noise and changing the transmission rate and/or the bit allocation within the symbol in real-time.

The main limitations with these algorithms as described is that they are too primitive (Baran) or slow and involve extended numerical calculations and sorting (Hughes-Hartogs, Chow et al.).

Baran's algorithm does not actually allocate bits to carriers according to a changed SNR distribution among the subchannels; it merely terminates subchannels that have lower SNR than some predetermined value.

The Chow et al. algorithm with its extended numerical calculations involving, inter alia, a number of computationally complex steps, is best run on a microprocessor. Thus, the algorithm increases system cost and reduces speed.

SUMMARY OF THE INVENTION

It is an object of the present invention to provide a method for allocating bits to carriers in a multicarrier or discrete multi tone (DMT) modulated transmission system that uses less computational power as compared with bit allocation in prior art and to provide the transmission system.

It is a further object of the invention to provide the allocating of bits to carriers at a fast rate.

It is yet a further object of the invention to provide the allocating of bits to carriers as being implemented in specific hardware.

It is still a further object of the invention to provide the allocating of bits to carriers at system startup and/or during system operation.

These objects among others are, according to one aspect of the invention, fulfilled by a method and system that comprises the following steps. A quality factor $l_j$ is associated to each carrier j, j=1, . . . , N. A loading constant Lc is computed as the quotient of a difference and the number of carriers Nr that remain to get bits allocated, said difference being the difference of the sum of the quality factors $l_k$ for carriers k, k=1, . . . , N, that remain to get bits allocated and the total number of data bits nr that remain to be allocated. Then a number of bits $n_i$ is allocated to a carrier i that remains to get bits allocated, said number of bits $n_i$ being the difference of the quality factor $l_j$ and the loading constant Lc rounded to nearest integer. The step of allocating a number of bits to a carrier is repeated for other carriers until a predetermined fraction of the carriers that remain to get bits allocated have bits allocated. Finally, all steps but the first (associating a quality factor $l_j$ to each carrier j, j=1, . . . , N) are repeated until all carriers j have bits allocated.

However, in specific situations the difference of the quality factor $l_j$ and the loading constant Lc rounded to nearest integer, i.e., the number of bits $n_j$ that is to be allocated to a carrier j, may be lower than zero or very high. Values lower than zero are of course not possible to allocate and hardware limitations often specify a maximum number of bits nmax to be allocated to a single carrier. Consequently, there is a need to handle these kind of extreme values of $n_j$.

This need is, according to another aspect of the present invention, fulfilled by a method and system that in addition to all of the above described steps comprises the following steps. If the number of bits $n_j$ for any carrier j falls above nmax, the quality factor $l_j$ for that carrier/those carriers j is set to the sum of the maximum number of bits nmax and the loading constant Lc rounded to nearest integer. If the number of bits $n_j$ for any carrier j falls below zero, the quality factor $l_j$ for that carrier/those carriers j is set to the value of the loading constant Lc rounded to nearest integer. Finally, if the number of bits $n_j$ for any carrier j has fallen outside the range [0,nmax] and consequently been set to a new value, all steps except the first step (associating a quality factor $l_j$ to each carrier j, j=1, . . . , N) are repeated. This iterative procedure is continued until all carriers j have a number of bits allocated that falls inside the range [0,nmax].

Preferably, the quality factor $l_j$, j 1, . . . , N, is related to a noise variance or an error on the corresponding carrier j. The quality factor is by preference set to the two-logarithm of the inverse of the noise variance to which an offset factor $\delta_j$ may be, but not necessarily, added.

The noise variance may be measured on a receiver side of the transmission system, e.g., as the absolute value of the difference of received signal and sent signal (or what is believed to be the sent signal).

The allocating of bits to carriers in an inventive manner may be performed at startup of the transmission system or during operation of the transmission system. In the latter case, the inventive allocating of bits may be performed if the noise changes in some manner. To discover a change in the noise, it may be measured continuously or at least on a regular basis.

The predetermined fraction of carriers to which bits are allocated before a new loading constant Lc is computed may be chosen as one half of the carriers that remain to get bits allocated. This value facilitates hardware implementation of the invention since the division in the calculation of the loading constant may be effected by a shift operation.

An advantage of the present invention is that the bit computation is simple and rapid, thus permitting adaptive allocation of bits in real time to accommodate, for example, changing carrier conditions.

Another advantage of the invention is that the simplified procedures allows implementation using dedicated hardware for improved speed.

BRIEF DESCRIPTION OF THE DRAWINGS

The present invention will become more fully understood from the detailed description given hereinbelow and the accompanying FIGS. 1–5 which are given by way of illustration only, and thus are not limitative of the present invention.

DETAILED DESCRIPTION OF EMBODIMENTS

In the following description, for purposes of explanation and not limitation, specific details are set fourth, such as particular hardware, applications, techniques, etc. in order to provide a thorough understanding of the present invention. However, it will be apparent to one skilled,in the art that the present invention may be practiced in other embodiments that depart from these specific details. In other instances, detailed descriptions of well-known methods, protocols, devices, and circuits are omitted so as not to obscure the description of the present invention with unnecessary details.

Figure 1:
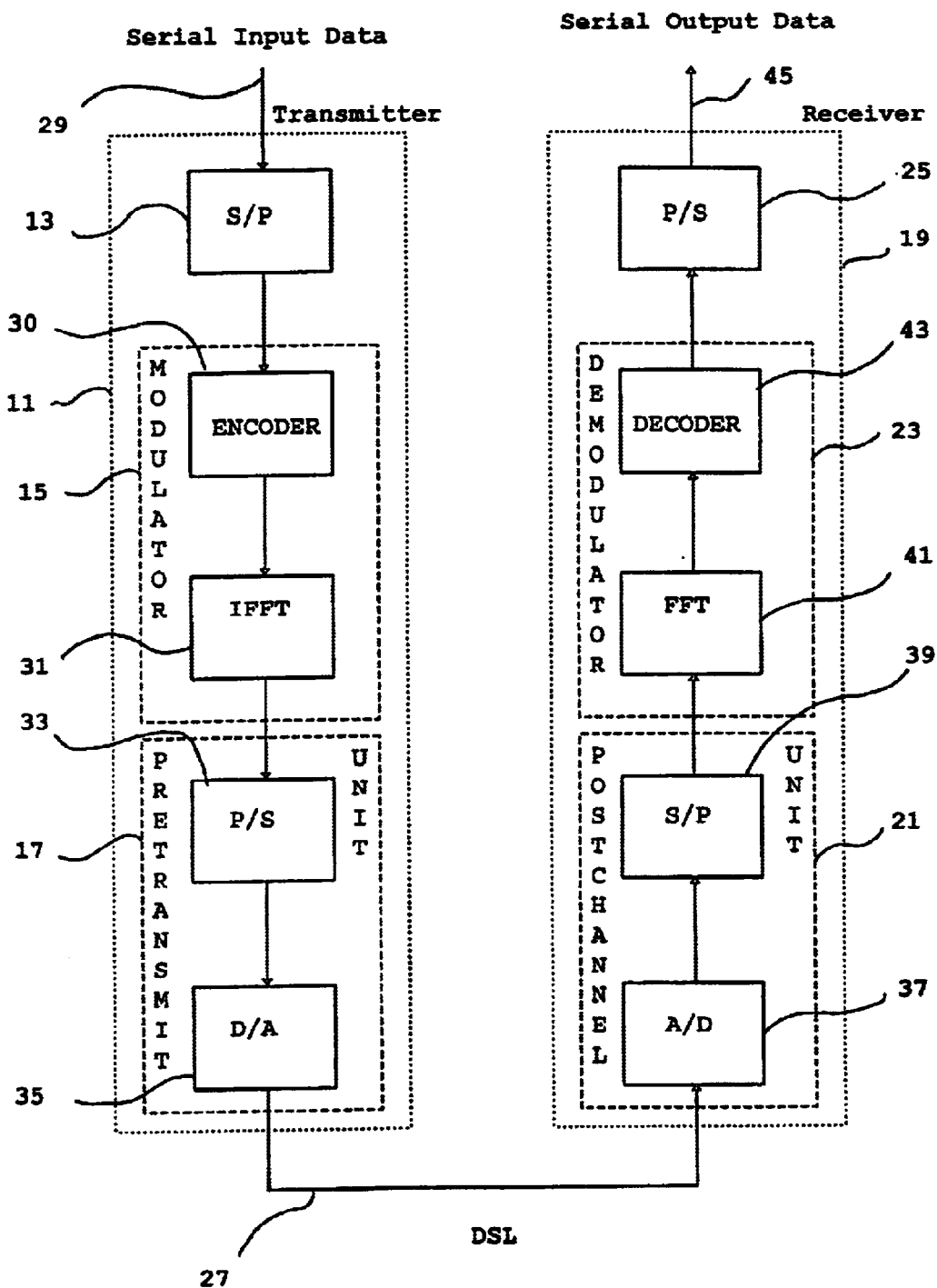
FIG. 1 shows a block diagram illustrating a multicarrier transmitter, a transmission link and a multicarrier receiver according to the present invention.

FIG. 1 shows a block diagram of an example of a DMT (Discrete Multitone) communication system that together with additional hardware and/or software may constitute a transmission system according to the present invention. A transmitter 11 includes a serial-to-parallel converter 13, a multicarrier modulator 15, and a pretransmit unit 17. A receiver 19 includes a post channel unit 21, a multicarrier demodulator 23, and a parallel-to-serial converter 25.

The transmitter and receiver are linked in this example by a digital subscriber line (DSL) 27 or other form of communication channel.

Serial input data 29 at a rate of B/T bits per second are converted to a parallel form, i.e., grouped by the converter 13 into blocks of B bits for each multicarrier symbol, with a symbol period of T. The B bits in each multicarrier symbol are used to modulate N separate carriers in the modulator 15 with $n_j$ bits modulating the $j^{th}$ carrier.

A preferred example embodiment uses an inverse fast Fourier transform (IFFT) during modulation to generate $N_s$ time-domain samples of a transmit signal for each block of B bits, where $N_s$ is preferably equal to 2N. The corresponding multicarrier demodulator 23 performs a fast Fourier transform (FFT), where $n_j$ bits are recovered from the $j^{th}$ carrier. The carriers or subchannels in a DMT system are spaced 1/T Hz apart across the lower N/T Hz of the frequency band.

The serial input data that are grouped into blocks are appropriately encoded by an encoder 30. Each one of the N active subchannels contains a number of $n_j$ bits allocated to that subchannel. The total number of bits in a DMT symbol is therefore:

$$B = \sum_{j=1}^{N} n_j$$

Each of the N bit groups is mapped into a two-dimensional signal constellation. The relation between the number of bits in each block of bits $n_j$ and the necessary number of signal points M in a constellation is given by:

$$M=2^{n_j}$$

Provided that the same signal energy is used for all constellations, the distance between neighboring signal points is reduced with increasing constellation sizes resulting in an increased bit error rate (BER) with the same signal-to-noise ratio (SNR).

The output from the encoder is N complex numbers, one for each group of bits which are then fed to a device 31 that calculates the IFFT. The output is a real sequence that can be considered the superposing of N modulated orthogonal carriers spaced Δf apart.

The pre-transmit unit includes a converter 33 in which the parallel IFFT output is converted back to a serial data stream. Furthermore, during pre-transmit processing, the digital modulated data stream is cyclically prefixed, converted to analog form by a digital-to-analog converter 35, low-pass filtered, and passed through a DC isolating transformer (not shown in FIG. 1) to produce an analog transmit signal that is the input to the transmission channel 27.

At receiver end, during postchannel processing, the received analog signal is passed through a DC isolating transformer and low-pass filter (not shown in FIG. 1), converted to digital form by an analog-to-digital converter 37, time domain pre-equalized by a finite impulse response (FIR) filter (not shown in FIG. 1) to limit the effective memory of the channel, stripped of the cyclic prefix and converted to a parallel data stream in a serial-to-parallel converter 39.

The resulting digital signals are demodulated by an FFT operation in a device 41 and converted to parallel frequency domain signals. Since the amplitude vs. frequency and the delay vs. frequency responses of the channel are not necessarily constant across the entire used frequency band, the received signal will differ from the transmitted signal, and the parallel inputs to a decoder 43 will differ from those parallel outputs from the encoder 30. A simple form of equalization used to compensate these differences is a frequency domain equalizer (FEQ) (not shown in FIG. 1), which individually adjusts for the attenuation and delay of each of the carriers immediately before the parallel frequency domain signals are passed to the decoder 43 for decoding. Lastly, the data streams are converted back to a serial output data stream 45 by the parallel-to-toserial converter 25. Ideally, the detected output serial data from the decoder will be identical to the input serial data to the encoder 30.

Further details regarding multicarrier modulation may be found for instance in the Bingham article, in Discrete Multiple Tone Modulation with Coset Coding for the Spectrally Shaped Channel, IEEE Transactions on Communications, Vol. 40, No. 6, pp. 1012–1029, June 1992 by A Ruiz et al. and in the Chow patent. These documents are hereby incorporated by reference.

The bitloading method allocates bits to be transmitted in such a way that each subchannel satisfies the demands on probability of a symbol error, $P_M$, within a system performance margin. The bit allocation is based on a noise variance $\sigma^2$, in each subchannel and prior knowledge of the average energy in each subchannel constellation, which together effectively provide the signal-to-noise ratio SNR for each subchannel.

According to J. G. Proakis, *Digital Communications*, $3_{rd}$ edition, McGraw-Hill, New York (1995), the symbol error probability $P_M$ for a rectangular constellation in Additive Gaussian Noise (AWGN) is tightly upper bounded by:

$$P_M \leq 4Q\left(\sqrt{\frac{3\varepsilon_{av}}{(M-1)N_0}}\right)$$

where a number of constellation points M per subchannel is defined as $M=2^n$; $n=1,2,\ldots$, is the number of bits conveyed per each signal point in the constellation; $\epsilon_{av}$ is the average energy of the subchannel constellation and is a known design parameter set for each subchannel constellation; and $N_o$ is the single-sided power spectral density of the noise for a received signal constellation point (at the receiver) and is defined as $N_0=2\sigma^2$, where $\sigma^2$ is the received noise variance per real/imaginary dimension. The noise variance can be visualized (in a simplified manner) as the variance of the symbol error, i.e., between the signal point received and the closest constellation signal point in the complex plane. The Q function relates the signal-to-noise ratio to the symbol error $P_M$ for a particular constellation size.

Even though the symbol error probability $P_M$ and the bit error rate (BER) are not identical, this analysis assumes that $P_M$ and BER are approximately the same because one symbol usually corresponds to one or more bits. Certain symbol encoding techniques, i.e., Gray coding where adjacent symbols containing the most likely errors only differ by one bit, may be employed to ensure that the bit error probability and the symbol error probability are very similar.

In most practical applications, the bit error rate (and in this application the symbol error rate $P_M$) is a known system design constraint. To achieve the same BER (or $P_M$) for all subchannel signal constellations and thereby optimally allocate bits to each subchannel under a constraint that the average energy of all subchannel constellations is the same, the denominator $(M-1)N_0$ of the above equation must be maintained constant, i.e., $$(M-1)N_0=2\sigma^2(2^n-1)=C$$

The constant C depends on the specific BER to be achieved. Solving the equation for the number of bits to be allocated, n, provides the number of bits that may be assigned to a subchannel given a certain BER and the noise variance $\sigma_j^2$ on that particular subchannel, i.e., the bit allocation for each subchannel j corresponding to $n_j$:

$$n_j = \log_2\left(1 + \frac{C}{2\sigma_j^2}\right)$$

where $\sigma_j^2$ is the noise variance on subchannel j and C is:

$$C = 3\varepsilon_{av}\left[Q^{-1}\left(\frac{P_M}{4}\right)\right]^{-2}$$

In a particular implementation, the bit loading values are distributed proportional to the inverse of $\log_2$ of the noise variance $\sigma_j^2$ on the corresponding channel or carrier j. The values are limited to integer constellations, e.g., by rounding them to integer constellation sizes which affects the total number of allocated bits.

Figure 2:
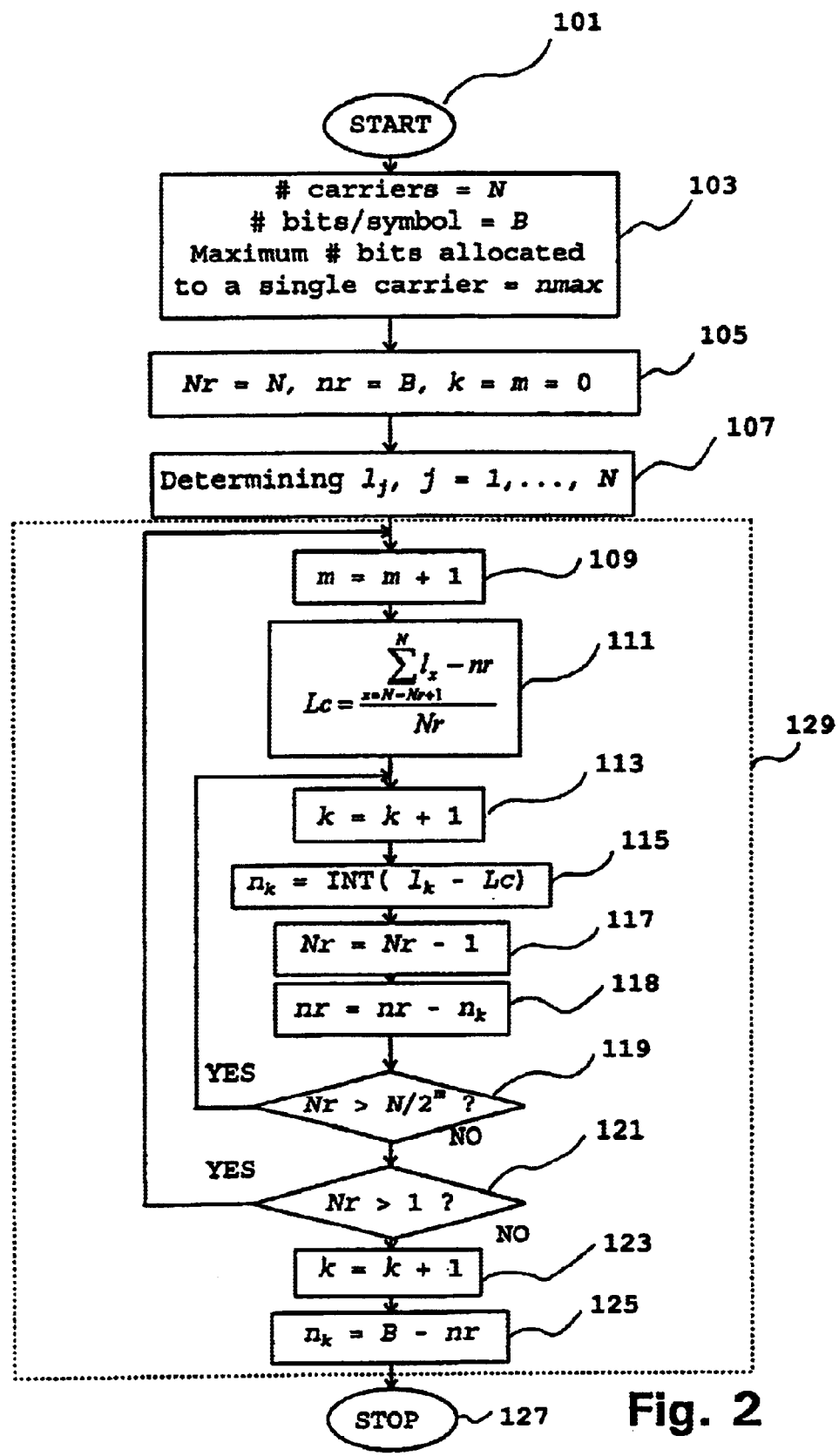
FIG. 2 shows a flow chart depicting an inventive bit allocation method.

In the following and with reference to FIGS. 1 and 2, a detailed depiction of the bit allocation method in accordance with the present invention is presented.

The inventive method may be initiated 101 by defining 103 the values of the total number of carriers N and the total number of bits B to be allocated and preferably also a maximum number of bits nmax that is allowed to be allocated to a single carrier.

A number of variables are introduced and initially given a value 105. A variable specifying the number of carriers Nr that remain to get bits allocated is set to N. Another variable nr, that specifies the number of data bits that remain to be allocated to carriers, is initially set to B. Furthermore, two variables m and k are set to zero.

A quality factor $l_j$ is then determined 107 for each carrier j, j, j=1, . . . , N, where N is the total number of carriers. The quality factor $l_j$ is related to the noise or error on the corresponding carrier j, j=1, . . . , N.

Preferably, the quality factor $l_j$, j=1, . . . , N, is set to the two-logarithm of the inverse of the received noise variance $\sigma^2$. To this value an offset factor $\delta^2$ may be, but not necessarily, added. The noise variance $\sigma^2$ may be measured on a receiver side of the transmission system, e.g., as the absolute value of the difference of received signal and sent signal (or what is believed to be the sent signal).

The variable m is incremented 109 by one:

$$m=m+1$$

whereafter a loading constant Lc is computed 111 as the quotient of a difference and the number of carriers Nr that remain to get bits allocated, said difference being the difference of the sum of the quality factors $l_k$ for carriers k, k 32 1, . . . , Nr, that remain to get bits allocated and the total number of data bits nr that remain to be allocated, i.e.:

$$Lc = \frac{\sum_{x=N-Nr+1}^{N} l_x - nr}{Nr}$$

Then, k is incremented 113 by one:

$$k=k+1$$

The number of bits $n_k$ to be allocated to carrier k is now calculated 115 as:

$$n_k=\text{INT}(l^k-Lc)$$

The value of $n_k$ must be rounded to nearest integer as only an integer number of bits may be allocated to a carrier. Then, the number of carriers Nr that remain to get bits allocated is decreased 117 by one:

$$Nr=Nr-1$$

and the number of remaining data bits nr to be allocated is reduced 118 according to:

$$nr=nr-n_k$$

It is checked 119 whether $$Nr>N/2^m$$

and if that is the case the steps 113 through 118 is repeated until Nr is equal to $N/2^m$. The predetermined fraction $N/2^m$ of carriers to which bits are allocated before a new loading constant Lc is computed 111, is chosen as one half of the carriers that remain to get bits allocated. This value facilitates hardware implementation of the invention since the division in the calculation of the loading constant may be effected by a shift operation. However, theoretically, the fraction may be set to other values, e.g., one fourth of the carriers that remain to get bits allocated.

The reason for recalculating a new value of Lc when half the remaining carriers has got bits allocated is to avoid error accumulation. This means that a new value of Lc will be calculated when remaining carriers to allocate is N, N/2, N/4, . . . , 4, 2, 1. This guarantees that all bits will be allocated.

Finally, it is checked 121 whether Nr is higher than 1, i.e. if:

$$Nr>1$$

If Nr is higher than 1, the steps 109 trough 119 is repeated until the condition no longer holds. At this point only one carrier remains to get bits allocated. This is achieved by incrementing 123 k by one and by computing 125 $n_k$ as:

$$n_k=B-nr$$

whereafter the inventive procedure is terminated 127. The steps 109–125 are referred to as procedure 129 in the following of the description. In this description it is assumed that the total number of carriers N may be written in the form $2^x$, x being an integer. If other number of carriers are to be used the method has to be slightly modified regarding, e.g., the predetermined fraction $N/2^m$.

In specific situations the difference of the quality factor $l_j$ and the loading constant Lc rounded to nearest integer, i.e., the number of bits $n_j$ that is to be allocated to a carrier j, ay be computed to be lower than zero or very high. Values lower than zero is of course not possible to allocate and hardware limitations often specify a maximum number of bits nmax to be allocated to a single carrier. Consequently, there is a need to handle these kind of extreme values of $n_j$.

Figure 3:
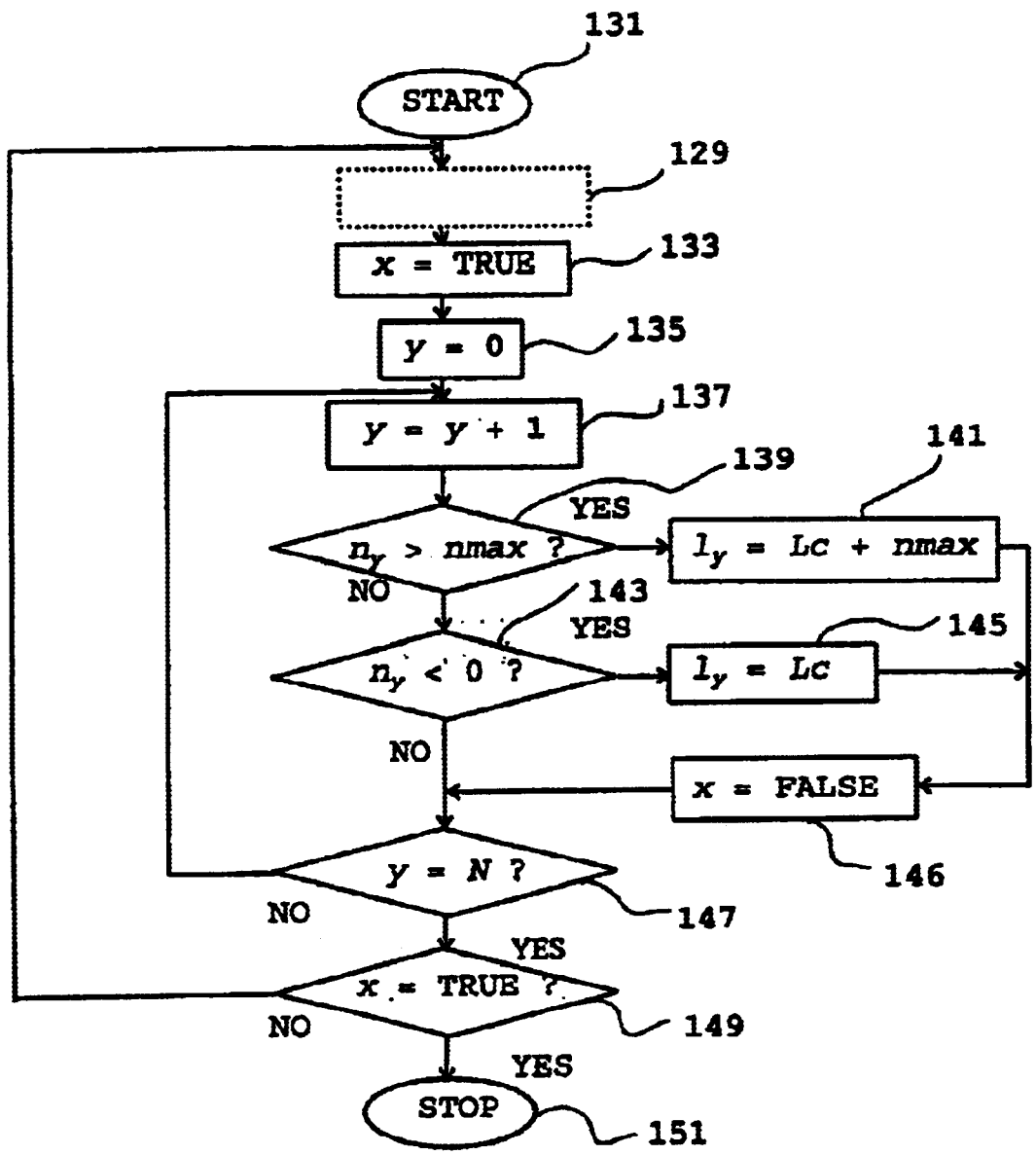
FIG. 3 shows a flow chart depicting a refinement of the inventive bit allocation method.

This need is realized by another version of the present invention, which includes a refinement. This version will now be described in detail in connection with FIG. 3, which shows a flow chart depicting the refined method.

The method is initiated 131. Then it follows the procedure 129 (steps 109–125) described above, after which a variable x is set 133 to "TRUE" and a variable y is set 135 to zero and then incremented 137 by one, i.e.:

x="TRUE" (step 133)
y=0 (step 135)
y=y+1 (step 137)

Then, it is checked 139 whether $$n_y>n\text{max}$$

and if so the quality factor $l_y$ for that carrier y has to be recalculated 141 as $$l_y=Lc+n\text{max}$$

If $n_y$ is not higher than nmax it is controlled 143 if $$n_y<0$$

and if $n_y$ is less than zero the quality factor $l_y$ is recalculated 145 as $$l_y=Lc$$

If $n_y$ is recalculated according to step 141 or 145, the variable x is set 146 to "FALSE". After this step 146 or if $$0<n_y\leq n\text{max}$$

it is checked 147 if y equals the total number of carriers:

$$y=N?$$

If this is not true the steps 137–146 are repeated, i.e., it is checked for each carrier y, y=1, ..., N, if the number of bits allocated to it falls above nmax or below zero. The quality factor $l_y$ for that carrier/those carriers is recomputed.

It is then checked 149 if $$x = \text{"TRUE"}$$

i.e., if no quality factor has been recomputed. If so, the inventive method is terminated 151. Otherwise, the complete set of procedures are repeated, i.e., procedure 129 and steps 133–147 until the x variable is kept as "TRUE" through one whole iteration.

Alternatively, procedure 129 and steps 133–147 are repeated a predetermined number of times (3–30) in order to achieve a simpler implementation. The number of iterations has thus to be specified in such a manner that extreme values of $n_y$, y=1, ..., N, are eliminated.

Figure 4:
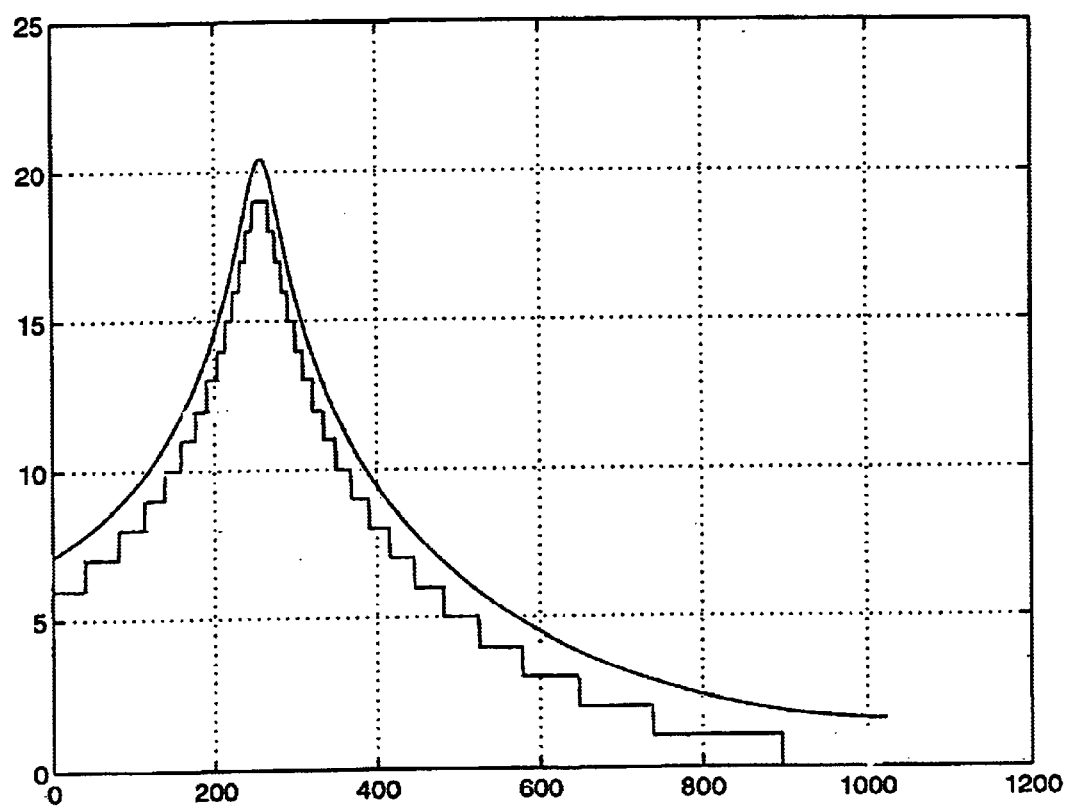
FIG. 4 illustrates, in the frequency domain, an example of a multicarrier quality distribution and the resulting multicarrier bit allocation in accordance with the invention.

FIG. 4 and illustrate, in the frequency domain, examples of a multicarrier quality distribution and the resulting multicarrier bit allocation in accordance with the present invention. The quality distribution 1 (in arbitrary units) vs carrier number j is an assumed smooth curve and the bit allocation n (in number of bits) vs carrier number is a stepwise function. The number of total carriers N is 1024 and the total number of bits B in a symbol is 6000.

Figure 5:
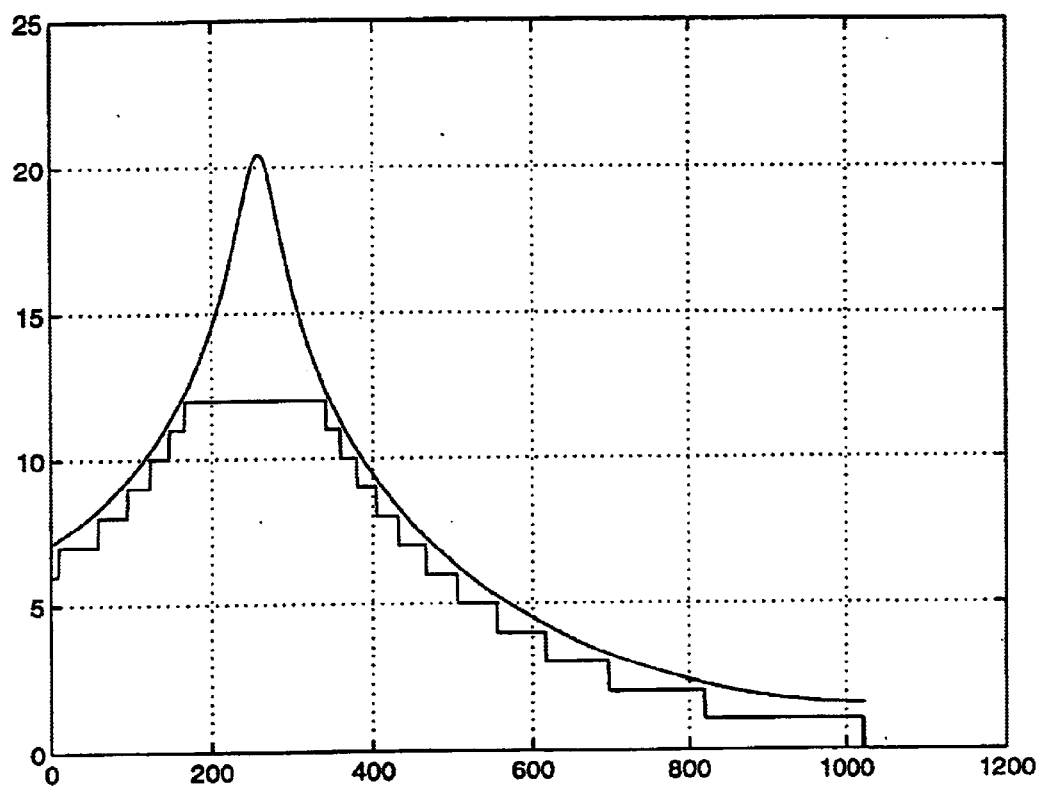
FIG. 5 illustrates, in the frequency domain, an example of a multicarrier quality distribution and the resulting multicarrier bit allocation in accordance with the refined algorithm as shown in FIG. 3.

FIG. 4 shows a bit allocation result without any limitations of a maximum number of bits that may be allocated to a single carrier. FIG. 5 shows the result when the refined method has been used (nmax=12).

The allocating of bits to carriers in an inventive manner may be performed at startup of the transmission system or during operation of the transmission system. In the latter case, the inventive allocating of bits may be performed if the noise changes in some manner. To discover a change in the noise, it may be measured continuously or at least on a regular basis.

An advantage of the invention is that the bit computation in this way permits adaptive allocation of bits in real time to accommodate, for example, changing carrier conditions.

Another advantage of the invention is that the simplified procedures allows implementation using dedicated hardware (instead of software) for improved speed.

The present invention may, of course, be applied to any communications application that employs multicarrier modulation. One example application in addition to wireline DSL applications is transmission in radio frequency bands.

The invention being thus described, it will be obvious that the same may be varied in a plurality of ways. Such variations are not to be regarded as a departure from the scope of the invention. All such modifications as would be obvious to one skilled in the art are intended to be included within the scope of the appended claims.

What is claimed is:

1. A method for allocating bits to carriers in a multicarrier or discrete multi tone (DMT) modulated transmission system, wherein a number of carriers N and a number of bits B are limited, the former due to useable frequency band and carrier spacing and the latter due to bit rate and block size, comprising the steps of:
   (i) associating a quality factor $l_j$ to each carrier j, j=1, ..., N,
   (ii) computing a loading constant Lc as the quotient of a difference and the number of carriers Nr that remain to get bits allocated, said difference being the difference of the sum of the quality factors $l_k$ for carriers k, k=1, ..., Nr, that remain to get bits allocated and the total number of data bits nr that remain to be allocated,
   (iii) allocating a number of bits $n_i$ to a carrier i that remains to get bits allocated, said number of bits $n_i$ being the difference of the quality factor $l_i$ and the loading constant Lc rounded to nearest integer,
   (iv) repeating the step of allocating until a predetermined fraction of the carriers k, k=1, ..., Nr, have bits allocated, and
   (v) repeating the steps (ii)–(iv) until all carriers j have bits allocated.

2. The method as claimed in claim 1, further comprising the steps of:
   (vi) in the event that the number of bits $n_j$ for any carrier j falling above the range [0,nmax], nmax being a predetermined maximum number of bits to be allocated to a single carrier, setting the quality factor $l_j$ for that carrier/those carriers j to the sum of the maximum number of bits nmax and the loading constant Lc,
   (vii) in the event that the number of bits $n_j$ for any carrier j falling below the range [0,nmax] setting the quality factor $l_j$ for that carrier/those carriers j to equal the loading constant Lc, and
   (viii) in the event that the number of bits $n_j$ for any carrier j falling outside the range [0,nmax] repeating the steps (ii)–(vii).

3. The method as claimed in claim 1 wherein each carrier j includes noise variances and comprises the step of or setting the quality factor $l_j$, j=1, ..., N, to the two-logarithm of the inverse of the noise variance on the corresponding carrier j, j=1, ..., N, prior to performing step (ii).

4. The method as claimed in claim 1 comprising the step of setting the quality factor $l_j$, j=1, ..., N, to the sum of the two-logarithm of the inverse of the noise variance on the corresponding carrier j, j=1, ..., N, and an offset factor $\delta_j$, j=1, ..., N, prior to performing step (ii).

5. The method as claimed in claim 3 comprising the step of measuring the noise $n_j$, j=1, ..., N, on a receiver side of the transmission system.

6. The method as claimed in claim 5, comprising the step of measuring the noise $n_j$, j=1, ..., N, as the absolute value of the difference of received signal and sent signal or what is believed to be the sent signal.

7. The method as claimed claim 5 wherein said step of measuring is being performed during operation of the transmission system.

8. The method as claimed in claim 7, wherein said step of measuring is being performed in the event that the noise $n_j$, j=1, ..., N, changes in some manner.

9. The method as claimed in claim 1 being performed at startup of the transmission system.

10. The method as claimed in claim 1 wherein choosing one half, ½, as the predetermined fraction of the carriers k.

11. The method as claimed in claim 1 wherein choosing one fourth, ¼, as the predetermined fraction of the carriers k.

12. A multicarrier or discrete multi tone (DMT) modulated transmission system, wherein a number of carriers N and a number of bits B are limited, the former due to useable frequency band and carrier spacing and the latter due to bit rate and block size, comprising:
   (i) means for associating a quality factor $l_j$ to each carrier j, j=1, ..., N,
   (ii) means for computing a loading constant Lc as the quotient of a difference and the number of carriers Nr that remain to get bits allocated, said difference being the difference of the sum of the quality factors $l_k$ for carriers k, k=1, ..., Nr, that remain to get bits allocated and the total number of data bits nr that remain to be allocated, (iii) means for allocating a number of bits $n_j$ to a carrier j that remains to get bits allocated, said number of bits $n_j$ being the difference of the quality factor $l_j$ and the loading constant Lc rounded to nearest integer, (iv) means for repeating the step of allocating until a predetermined fraction of the carriers k, k=*1*, ..., Nr, have bits allocated, and (v) means for repeating the steps (ii)–(iv) until all carriers j have bits allocated.

13. The multicarrier transmission system as claimed in claim 12, further comprising:

(vi) means for, in the event that the number of bits $n_j$ for any carrier j falling above the range [0,nmax], nmax being a predetermined maximum number of bits to be allocated to a single carrier, setting the quality factor $l_j$ for that carrier/those carriers j to the sum of the maximum number of bits nmax and the loading constant Lc, (vii) means for, in the event that the number of bits $n_j$ for any carrier j falling below the range [0,nmax], setting the quality factor $l_j$ for that carrier/those carriers j to equal the loading constant Lc, and (viii) means for, in the event that the number of bits $n_j$ for any carrier j falling outside the range [0,nmax], repeating the steps (ii)–(vii).

* * * * *